E. M. TINGLEY.
COIL SUPPORT FOR DYNAMO ELECTRIC MACHINES.
APPLICATION FILED FEB. 20, 1906. RENEWED DEC. 21, 1906.
1,007,506.
Patented Oct. 31, 1911.
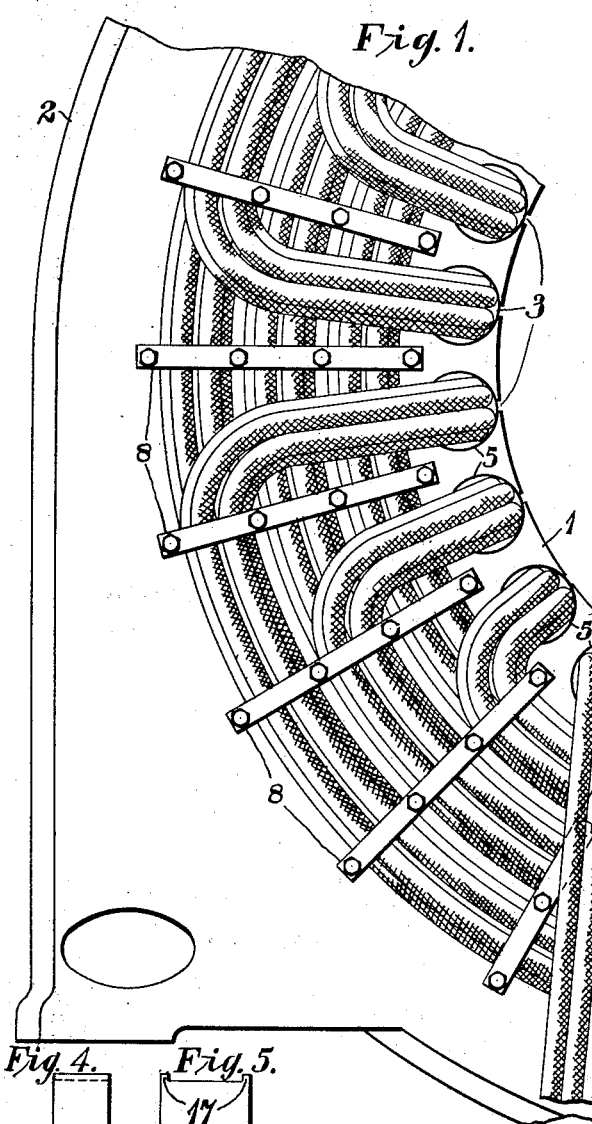
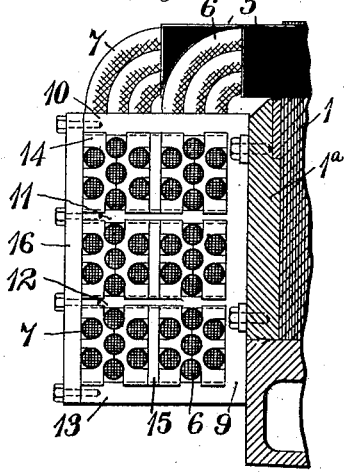
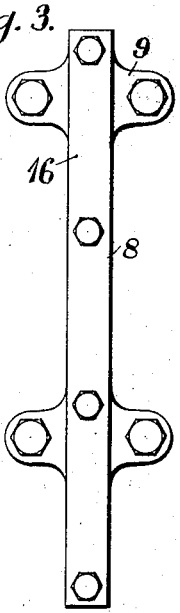
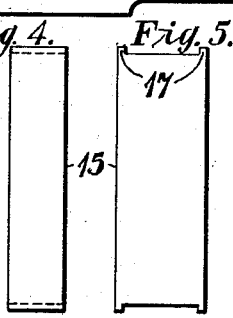
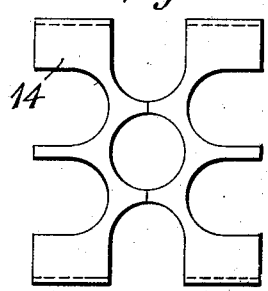
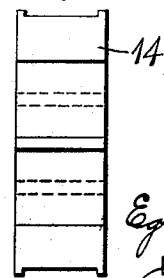

UNITED STATES PATENT OFFICE.

EGBERT M. TINGLEY, OF PITTSBURGH, PENNSYLVANIA, ASSIGNOR TO WESTINGHOUSE ELECTRIC & MANUFACTURING COMPANY, A CORPORATION OF PENNSYLVANIA.

COIL-SUPPORT FOR DYNAMO-ELECTRIC MACHINES.

1,007,506. Specification of Letters Patent. Patented Oct. 31, 1911.

Application filed February 20, 1906, Serial No. 302,100. Renewed December 21, 1906. Serial No. 348,966.

*To all whom it may concern:*

Be it known that I, EGBERT M. TINGLEY, a citizen of the United States, and a resident of Pittsburgh, in the county of Allegheny and State of Pennsylvania, have invented a new and useful Improvement in Coil-Supports for Dynamo-Electric Machines, of which the following is a specification.

My invention relates to dynamo-electric machines and particularly to supporting means for the coils of such machines.

The object of my invention is to provide coil-supporting means for dynamo-electric machines which shall effectually prevent warping or displacement of the coils when subjected to mechanical and electro-magnetic strains and which shall also facilitate the winding of such coils as are formed by threading conductors or cables back and forth through the core slots.

Experience has demonstrated that the portions of coils that project beyond the ends of the core slots of dynamo-electric machines may be subjected to excessive strains which tend to violently distort the coils and thus cause serious damage to them in the event of the occurrence of a short-circuit. This distortion may be explained as the reaction, upon each other, of stray magnetic fields which are set up by the excessive short-circuited electric currents in different sets of coils, since the tendency is apparently greatest in machines having comparatively few poles, and in which the ampere turns are concentrated in a small number of groups, as is the case in high speed turbo-generator armatures.

The explanation included herein is not set forth as necessarily stating the correct reason for the coil distortion but is merely intended to present a reasonable theory for what takes place when coils that are not properly supported are short-circuited.

In order to meet the above specified conditions for hand-wound coils, I have devised supports which have such form and arrangement and are so combined with the frame, core and winding as to successfully resist all tendency to displacement of said winding, or any part thereof, in any direction.

The coil supports of my present invention are specially advantageous in that they obviate the necessity for using a temporary form during the winding process, the conductors being shaped directly into position on the support. A portion of the coil support is first attached to the stationary frame of the dynamo-electric machine; the winding is then placed in position in the core slots and on the initially-applied frame portion, together with other frame portions, and finally the support is completed.

My invention is illustrated in the accompanying drawings in which—

Figure 1 is an end elevation of a portion of a stationary armature equipped with coil supports constructed in accordance therewith. Fig. 2 is a sectional view of a portion of the armature core which further discloses one of the coil supports shown in Fig. 1, and Figs. 3, 4, 5, 6 and 7 are detail views of the coil support on a larger scale than that employed in the other figures.

Referring to the drawings, an armature core 1 is supported by a frame 2 and is provided with a plurality of slots 3, of circular cross-section, in which a winding 4 is placed. The conductors are insulated from the slots in which they are located by tubes 5 of suitable material and constitute groups of cables which are insulated from each other in the usual manner.

The windings of stationary, polyphase armatures require some special disposition of the end connections since those of one phase overlap those of another phase; that is, if the winding pertaining to one phase is considered as the main winding, those pertaining to the other phases may be considered as interpolar windings. In order to avoid interference of the end connections, it is usual to bend the coils of the main winding away from the axis of the core and to dispose the end connections concentrically with the core face and slightly farther from the axis than the bottoms of the slots. The coils from the interpolar slots may be extended in straight lines until the main coils are avoided and then be similarly disposed in planes more distant from the core. The winding here illustrated is a two-phase winding and has for every pole, two coils 6 and 7 that are formed and disposed in the aforesaid manner.

A plurality of similar coil-supports 8 are provided, each of which comprises a base strip 9 which may be attached to a rigid body, here indicated as the end ring 1ᵃ of the core 1, and a plurality of projecting arms 10, 11, 12 and 13; the projections 10 and 13 being located at the ends of the base strip and the projections 11 and 12 being equally spaced between the two outer projections. Spacing blocks 14 and 15 are fitted into the spaces between adjacent projections to separate and support the several cables of the winding and are held in position by a cap strip 16, which is bolted to the outer extremities of the projections 10, 11, 12 and 13 to complete the coil support, here shown as rectangular in form. The portion of the support comprising the base strip 9 and the several projections integral therewith, are preferably constructed of non-magnetizable material and is attached to the frame of the dynamo-electric machine in a radial plane before the winding is placed in the armature slots; then, as the cables are wound into the spaces between adjacent projections, the blocks 14 and 15 are fitted into such spaces and between and around the cables of which the winding is composed.

It will be observed that the spacing blocks are so divided as to obviate the necessity for threading the cables through any portion of the coil support and consequently the application of the support does not interfere with the winding of the machine but, on the contrary, facilitates the winding process, by serving as retaining guides. The spacing blocks 14 and 15, which may be constructed of any suitable material, may be made somewhat thicker than the projections 10, 11, 12 and 13 and be provided with flanges 17 between which the said projections fit to prevent lateral displacement. The blocks may, of course, be arranged to fit into grooves in the projections or be otherwise mounted to avoid displacement and are held in position by the cap strip 16 which is bolted to the outer extremities of the projections when the winding is completed.

Although the coil-support of my invention is illustrated for convenience in connection with a specific arrangement of armature coils, I desire it to be understood that any changes in the arrangement of the coils or in the size or shape of the support which do not materially alter the purpose or the results obtained, are within the scope of my invention.

I desire it to be further understood that my invention may be utilized in connection with either direct or alternating current generators or motors and for supporting the windings of either stationary or movable machine members provided the structural and operative conditions warrant such use.

I claim as my invention:

1. In a dynamo-electric machine, the combination with a stationary frame, a core supported thereon and provided with a plurality of slots, and a winding partially located in said slots, of a coil-support for said winding that comprises a base strip having end and intermediate projections, means for attaching the said strip to said frame and a cap strip removably attached to the outer extremities of the projections.

2. In a dynamo-electric machine, the combination with a stationary frame, a core supported thereon and provided with a plurality of slots, and a winding partially located in said slots, of a coil-support for said winding that comprises a base strip having end and intermediate projections substantially perpendicular thereto, means for attaching said strip to said frame and a cap strip removably attached to the extremities of the projections to form one side of the support.

3. In a dynamo-electric machine, the combination with a stationary frame, a core supported thereon and provided with a plurality of slots, and a winding partially located in said slots, of a coil-support for said winding that comprises a base strip having end and intermediate projections, means for attaching the said strip to said frame, a cap strip removably attached to the outer extremities of the projections, and a plurality of spacing blocks fitted between adjacent projections and comprising a plurality of complementary segments which fit between and around the several conductors to be supported and separated.

4. In a dynamo-electric machine, the combination with a stationary frame, a magnetizable core supported thereon and provided with a plurality of slots of substantially circular cross-section, tubes of insulating material located in said slots, and a winding extending through said tubes and comprising a plurality of flexible conducting cables, of supporting means for said winding comprising a base strip having end and intermediate projections substantially perpendicular thereto, means for attaching the said strip to said frame and a cap strip removably attached to the extremities of the projections.

5. In a dynamo-electric machine, the combination with a stationary frame, a magnetizable core supported thereon and provided with a plurality of slots of substantially circular cross-section, tubes of insulating material located in said slots, and a winding extending through said tubes and comprising a plurality of flexible conducting cables, of supporting means for said winding comprising a base strip having end and intermediate projections substantially perpendicular thereto, means for attaching said strip to said frame, a plurality of flanged spacing blocks fitted between adjacent projections and adapted to engage and separate the several cables of the winding, and a cap strip removably attached to the extremities of the several projections.

6. In a dynamo-electric machine, the combination with a slotted core, and multi-strand coils, the end portions of which are located in a plurality of different planes, of radial supporting devices uniformly spaced apart and fitted around and between said end portions and strands, and means for attaching said devices to the core.

7. In a dynamo-electric machine, the combination with a slotted core, and multi-strand coils, the end portions of which are located in a plurality of different planes substantially parallel to the core-ends, of uniformly spaced radial supports having parts that surround the coil ends and other parts that fit between them and the strands, and means for attaching the supports to the ends of the core.

8. In a dynamo-electric machine, the combination with a slotted core having multi-strand coils that project from the slots into a plurality of planes at each end of the core, of spaced radial supports that fit around and between the coil ends and strands and are fastened to the core.

9. A dynamo-electric machine having multi-strand coils and multi-part radial coil supports that are spaced apart around the core and are fitted between and around the coil ends and strands located in different planes at the ends of the core.

10. A dynamo-electric machine having multi-strand coils and radial coil-supporting members uniformly spaced apart around the core and severally comprising notched or recessed parts to fit around and between the coil ends and strands, and means for clamping said members and coil ends to the core.

11. A dynamo-electric machine having multi-strand coils and multi-part substantially radial coil-supporting members fitted between and around the coil ends and strands, and means for fastening the parts together and to the core.

In testimony whereof, I have hereunto subscribed my name this 17th day of February, 1906.

EGBERT M. TINGLEY.

Witnesses:
EDWIN M. TINES,
BIRNEY HINES.

---

Copies of this patent may be obtained for five cents each, by addressing the "Commissioner of Patents, Washington, D. C."